United States Patent [19]
Dooley

[11] 3,857,180
[45] Dec. 31, 1974

[54] CHAIN SAW INERTIA CLUTCH ASSEMBLY

[75] Inventor: James L. Dooley, Santa Monica, Calif.

[73] Assignee: McCulloch Corporation, Los Angeles

[22] Filed: Mar. 22, 1973

[21] Appl. No.: 343,978

[52] U.S. Cl............ 30/383, 192/103 C, 192/114 R, 192/105 CP
[51] Int. Cl......................... B27b 17/10, F16d 43/24
[58] Field of Search.... 192/14, 18 B, 103 A, 103 C, 192/105 C, 105 CP, 105 R, 105 B, 105 CS, 54, 55, 114 R; 30/381–387

[56] References Cited
UNITED STATES PATENTS

| 1,713,712 | 5/1929 | Philips | 192/114 X |
| 1,967,563 | 7/1934 | Russell | 192/70.23 |
| 1,998,172 | 4/1935 | Ross | 192/103 C |
| 2,072,117 | 3/1937 | Lewis | 192/105 C |
| 2,092,911 | 9/1937 | Eastman | 192/54 X |
| 2,529,014 | 11/1950 | Goldberg et al. | 192/105 C |
| 2,827,932 | 3/1958 | Strunk | 30/386 |
| 3,160,252 | 12/1964 | Steinlein | 192/103 A |
| 3,337,013 | 8/1967 | Wrensch | 192/18 B |
| 3,687,252 | 8/1972 | Krull | 192/14 |

Primary Examiner—Al Lawrence Smith
Assistant Examiner—K. J. Ramsey
Attorney, Agent, or Firm—Burns, Doane, Swecker & Mathis

[57] ABSTRACT

An inertia clutch assembly preferably for use in an engine-driven mechanism, such as a portable chain saw, includes an inertia element axially displaceable into clutching and declutching postures in response to acceleration and deceleration of the engine. To avoid undesirable momentary engagement due to engine speed surges at idle, an automatic restraining mechanism is provided for maintaining the inertia element in a declutching posture until the engine reaches a selected clutching speed. The inertia element is mounted on axially shiftable rollers, the rollers being interconnected by a cage to facilitate uniform shifting of the rollers and the inertia element. A magnetic brake shoe arrangement is provided for frictionally braking the cutter chain in response to declutching of the power train.

41 Claims, 9 Drawing Figures

PATENTED DEC 31 1974 3,857,180

CHAIN SAW INERTIA CLUTCH ASSEMBLY

BACKGROUND AND OBJECTS OF THE INVENTION

This invention relates to an inertia clutch assembly, particularly for use in conjunction with a portable engine-driven chain saw.

Hand manipulated, power driven chain saws are widely employed. Typically, such a chain saw includes a housing, an internal combustion engine carried therewithin, a guide bar projecting from the housing, a sprocket wheel rotatably mounted on the housing, and an endless cutter chain entrained around the guide bar and the sprocket wheel. The sprocket wheel is operably connected to and driven by the engine so that rotation of the sprocket wheel produces rotation of the cutter chain.

It is common to employ a speed-responsive clutch mechanism in the drive train connecting the engine and the sprocket wheel to prevent rotation of the sprocket wheel until such time as the engine attains a given speed. One form of clutch which has been successively utilized for this purpose is a centrifugal force-responsive clutch described for example, in U.S. Pat. No. 3,429,411 issued Feb. 25, 1969 to H. I. Hazzard and assigned to the assignee of the subject invention. Such a clutch includes a plurality of clutch shoes which are mounted for radial displacement on an engine driven shaft. In response to a predetermined rate of shaft rotation, corresponding to a desired clutching speed, the clutch shoes are outwardly displaced by centrifugal force into frictional driving engagement with a contact drum on a driven shaft. In this fashion, it can be assured that rotation of the cutter chain will be prevented during operation of the engine below the selected speed, such as speeds occurring during starting and idling conditions of the saw when operator attentiveness and caution may be at a minimum.

While clutches of the aforementioned centrifugal type have proven to be highly effective, it may be observed that since chain saws may be operated at speeds well above the selected clutching speed of a centrifugal clutch, there will normally be a time lag between the point at which the engine throttle is reduced, or closed, until the shaft decelerates to a point below clutching speed. Therefore, the saw chain may continue to run for several seconds even after the engine throttle is closed and power is terminated. As will thus be appreciated, in the absence of appropriate precautions on the part of the operator, this continual running may present safety problems.

It is, therefore, one object of the present invention to provide a novel clutch assembly for a power train, particularly the power train of a portable chain saw, which maximizes safety and efficiency of operation, and reduces chain wear.

It is another object of the invention to provide such a clutch assembly which is responsive to engine acceleration and deceleration to effect immediate clutching and declutching of the power train.

It is a further object of the invention to provide a novel clutch assembly which effects declutching of a power train independently of the clutching speed thereof.

It is yet another object of the invention to provide a novel clutch assembly for a chain saw which effects a rapid braking of the cutter chain immediately subsequent to declutching of the power train.

Clutch mechanisms which operate in response to engine acceleration and deceleration have been heretofore proposed. An example of one such prior proposal intended to be operated under principles of inertia is described in U.S. Pat. No. 2,092,911 issued Sept. 14, 1937. The clutch disclosed therein includes a threaded drive shaft on which is threadedly mounted a rotary inertia member. Acceleration of the drive shaft relative to the inertia member is intended to produce an axial displacement of the inertia member along the threaded drive shaft in a direction suitable for effecting a drive-transmitting engagement of the clutch. Conversely, deceleration of the engine drive shaft relative to the inertia member is intended to impart an opposite axial displacement of the inertia member to declutch the drive train.

Although an inertia clutch of this type may function adequately when employed in conjunction with large engines, it might not be entirely amenable to acceptable performance in smaller engines such as, for example, two-cycle internal combustion engines, as are commonly utilized in portable chain saws. In this connection, it is noted that two-cycle internal combustion engines, when operating at relatively low speed, such as at idle speed, may exhibit a kicking or jerking type of motion which might tend to cause intermittent engagement of an inertia clutch of the type previously described. In the case of chain saws and other hand manipulated tools, such intermittent clutch engagement could produce sudden unexpected start-ups of the tool, thereby posing a hazard to the operator.

At any rate, the use of a threaded connection between the drive shaft and the inertia member in such an inertia clutch might result in the generation of undesirable friction forces that resist movement of the inertia member toward its clutching and declutching positions.

It is, therefore, yet another object of the present invention to provide a novel inertia clutch assembly which is freely displaceable during operation of the engine above a selected speed, yet is automatically restrained against clutching engagement below this speed.

It is still a further object of the invention to provide a novel inertia clutch assembly which operates smoothly and rapidly with minimum frictional resistance.

BRIEF SUMMARY OF A PREFERRED FORM OF THE INVENTION

At least some of the foregoing objects are intended to be accomplished by the provision of an inertia clutch assembly according to the present invention for use in a power drive system. The power drive system includes an engine, a driven mechanism, and a drive train, including an engine-driven rotary element, for drivingly connecting the engine to the driven mechanism. The inertia clutch assembly is operably connected to the drive train and comprises an inertia element coupled to the rotary element. The inertia element is axially displaceable relative to the rotary element into a clutch position, in response to acceleration of the rotary element relative to the inertia element. The inertia element is also displaceable into a declutching posture in response to deceleration of the rotary element relative to the inertia element. A restraining mechanism is connected to the inertia element and is responsive to operation of the engine below a selected speed to restrain the inertia element against movement into the clutching posture, while allowing such movement when engine speed reaches the selected clutching speed.

A plurality of helical slots are carried by the rotary element, with the inertia element carrying an annular track which faces the slots. A plurality of friction reducing roller mechanisms are provided, each roller mechanism being disposed partially in a slot and partially in the annular track. In response to acceleration and deceleration of the rotary element relative to the inertia element, the roller mechanisms are arranged to shift longitudinally within the slots, to urge the inertia element axially. Thus, during relative acceleration, the inertia element is urged in an axial clutching direction to effect a rotation-transmitting coupling between the engine and the driven mechanism. On the other hand, during relative deceleration, the inertia element is urged in an axial declutching direction to decouple the engine from driving relationship with the driven mechanism.

The inertia clutch includes a cage structure which interconnects the roller mechanisms to effect a substantially uniform shifting of the roller mechanisms in their respective slots during axial displacement of the inertia element. In this fashion, smooth uniform travel of the inertia element is facilitated.

A spring may be employed in conjunction with the improved inertia clutch assembly to bias the inertia element of the clutch assembly away from its clutching posture, thereby facilitating rapid stoppage of the driven mechanism, such as the cutter chain of a portable chain saw.

A brake shoe is mounted adjacent a pressure plate member of the inertia clutch assembly. The pressure plate is axially translatable toward the brake shoe under the urging of a braking spring and in response to declutching of the power train, to arrest rotation of the pressure plate. The brake shoe is comprised of a permanently magnetized material to attract the pressure plate into firm frictional engagement.

DRAWINGS

Other objects and advantages of the present invention will become apparent with reference to the following detailed description of a preferred embodiment thereof in connection with the accompanying drawings wherein like reference numberals have been applied to like elements.

In the drawings.

DETAILED DESCRIPTION OF THE PREFERRED EMBODIMENT

Figure 1:
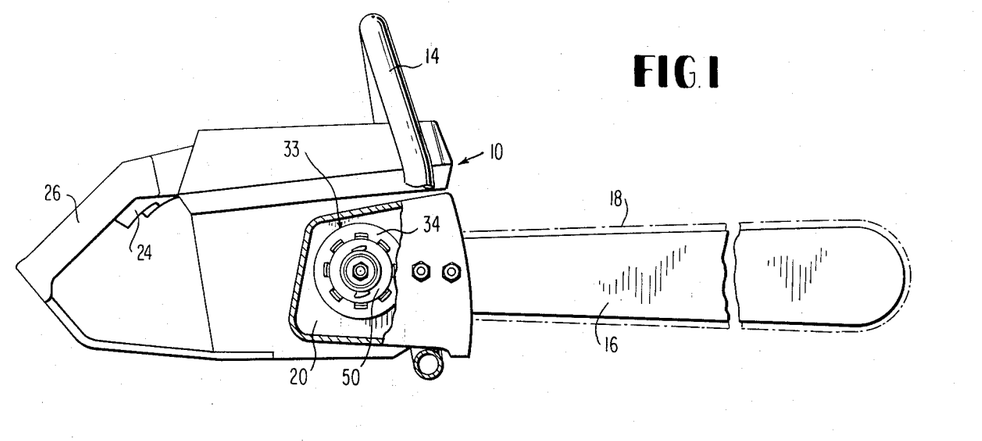
FIG. 1 illustrates a portable, power driven chain saw utilizing the novel inertia clutch assembly according to the present invention.

FIG. 1 depicts a hand-manipulated power-driven chain saw 10. The chain saw includes a housing 12 and a manual gripping handle 14 connected thereto. A guide bar 16 is mounted to and projects outwardly from the housing. An endless cutting chain 18 is entrained for rotary movement around the guide bar.

An internal combustion engine, schematically shown at 20, is carried within the housing 10 and includes a conventional carburetor, piston, and cylinder arrangement (not shown) and a drive shaft 22. The engine is controlled by means of a throttle switch 23 mounted on a control handle 26 which is mounted on the frame 10.

Figure 6:
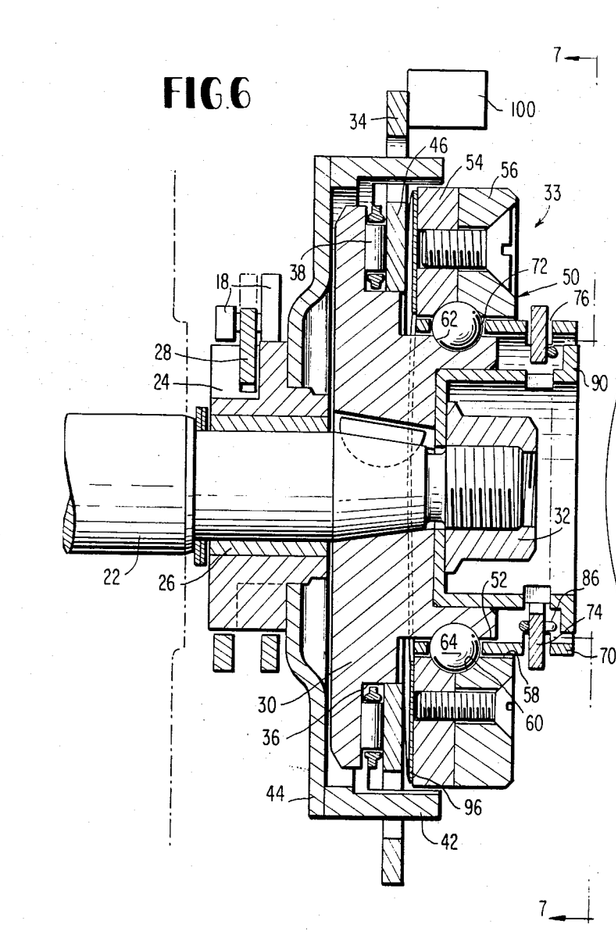
FIG. 6 is a longitudinal sectional view of the inertia clutch assembly in a declutching unrestrained posture.

As can be seen in FIG. 6, the drive shaft 22 rotatably mounts a sprocket wheel 24. This sprocket wheel is mounted for rotation relative to the drive shaft 22 by means of a conventional bearing 26. The cutter chain 18 is engaged by the teeth 28 of the sprocket wheel 24 in conventional fashion whereby rotation of the sprocket wheel drives the cutter chain around the guide bar 16.

At the outer end of the drive shaft 22 an annular hub member 30 is keyed onto the drive shaft for rotary movement therewith. A nut 32 is threadably fastened to the drive shaft to secure the hub 30 in place.

As described thus far, the chain saw includes an engine 20, a driven mechanism 18 and a drive train, including the drive shaft 22, the hub 30, and the sprocket wheel 24, for transmitting rotary motion from the engine to the driven mechanism. According to the invention, an inertia clutch assembly 33 is operably connected to the drive train for selectively coupling and decoupling the drive train This clutch assembly best illustrated in FIGS. 6 and 7 includes a pressure plate 34 which is mounted on an outer annular shoulder 36 of the hub 30 and rotates against a conventional needle bearing arrangement 38. The pressure plate 24 includes a plurality of slots 40 which matingly receive a plurality of lugs 42 which extend parallel to the drive shaft axis from a coupling disc 44. The coupling disc 44 is fixedly attached to the sprocket wheel 24, whereby rotation of the pressure plate 34 is transmitted to the sprocket wheel 24 by the lug and slot arrangement. The pressure plate also includes a pressure face 46 which defines a frictionally engageable clutching surface.

Figure 7:
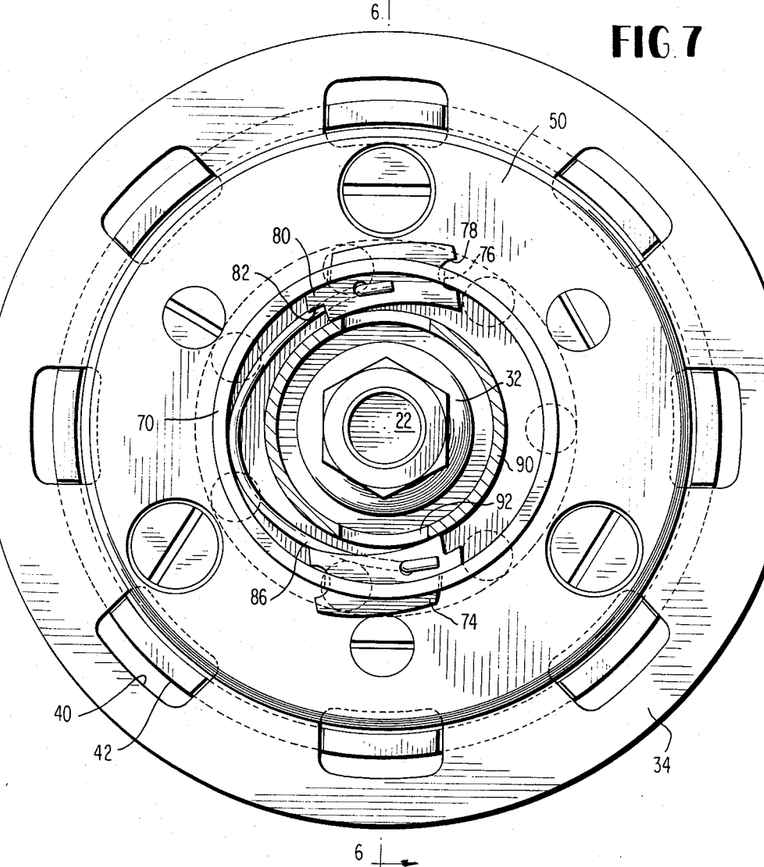
FIG. 7 is a corss-sectional view taken along the line 7—7 in FIG. 6.

The inertia clutch assembly further includes an inertia element preferably in the form of a wheel 50 which is carried on an inner annular shoulder 52 of the hub 30 by means to be subsequently described. The inertia wheel element 50 may comprise a pair of circular plates 54 and 56 which are bolted together in laminar fashion. The inertia element 50 operates under principles of inertia and is thus designed to exhibit a selected resistance to acceleration and deceleration.

The plates 54 and 56 of the inertia element 50 define an inner annular surface 58 which faces the inner shoulder 52 of the hub. These plates 54 and 56 also include annular grooves which, when the plates are coupled together, form a smooth annular track 60. The track 60 extends around the annular surface 58 of the inertia element in facing relation to a plurality of slots 62 formed in the inner shoulder 52. These slots 62 are arranged helically relative to the axis defined by the engine-driven rotary hub 30, as illustrated in FIG. 8.

A plurality of friction-reducing roller members, preferably in the form of bearing balls 64, are provided, each being disposed partially within a respective slot 62 and partially in the track 60. The balls 64 are capable of shifting along the longitudinal extent of the slots 62, as may be viewed in FIGS. 8 and 9. Insertion of the balls within the slots 62 may be accomplished, during clutch assemblage, after the placement of the plate 54 and prior to the bolting thereto of the plate 56.

It will be apparent that rotary motion may be frictionally transmitted from the hub 30 to the inertia element 50 by means of the track-ball-and-slot arrangement 60, 62, 64. Moreover, relative acceleration (or deceleration) of the hub 30 relative to the inertia element 50 will result in the inertia element being urged toward (or away from) the pressure plate 34.

Figure 8:
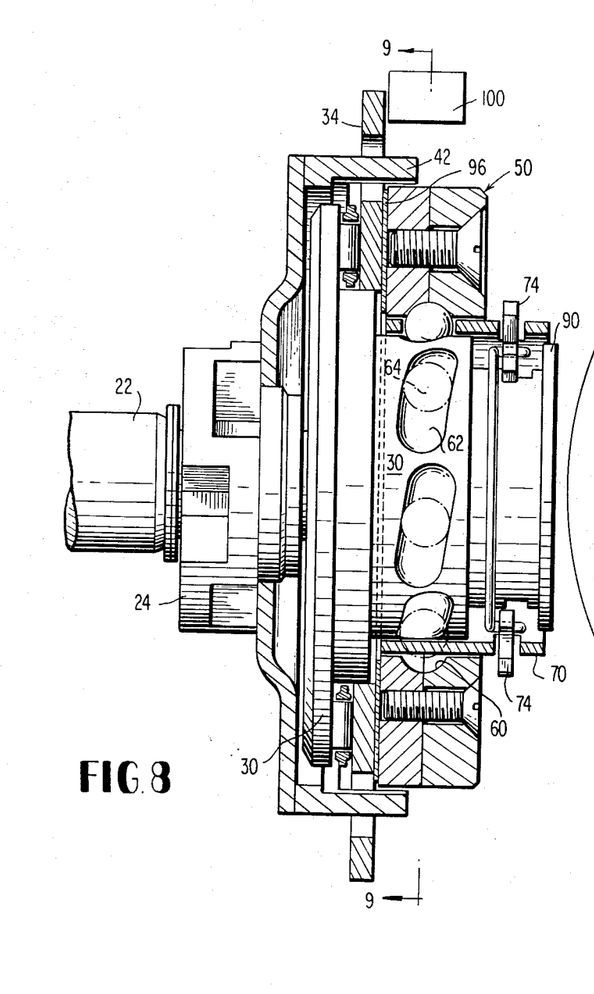
FIG. 8 is a partial, longitudinal, sectional view depicting the inertia clutch assembly in a clutching posture.

An example will be described in a case in which the engine is operating above clutching speed, wherein the inertia element 50 rotates in clutching relationship with the pressure plate 34 (clockwise as viewed in FIG. 9) to drive the sprocket wheel 24 (FIG. 8). Should it become necessary to terminate rotation of the cutter chain, the throttle switch 23 is released, thereby assuming an "idle" position. This causes engine speed to reduce, producing a corresponding slowdown in rotation of the drive shaft 22 and the hub 30.

The inertia element 50 will likewise tend to decelerate but at a rate which is less than that of the hub 30. Consequently, the inertia element will overrun the hub, thereby rotating relative thereto (i.e., relative clockwise rotation as viewed in FIG. 9). As this occurs, there will be sufficient friction generated between the inertia element 50 and the bearing balls 64 to cause the balls to shift within the slots 62.

Since the slots 62 are helically arranged relative to the axis of the hub, longitudinal movement of the balls 64 therewithin will result in the inertia element 50 being urged axially away from the pressure plate by the balls (FIG. 6). Thus, the balls 64 serve to transmit rotational drive from the hub to the inertia element as well as to transmit translational movement to the inertia element.

It will be apparent that axial displacement of the inertia element 50, toward a declutching posture, occurs almost instantly after the hub begins to decelerate. Therefore, in spite of the fact that the clutch may be rotating at speeds well above the normal, predetermined clutching speed of the engine, the inertia element will be displaced to a declutching posture. This compares favorably over the operation of a centrifugal-type of clutch presently utilized in chain saws, wherein declutching is delayed until the engine has decelerated below the predetermined clutching speed. The elimination of such a time delay between throttle adjustment and chain stoppage can be crucial in an emergency situation, such as an instance when an inattentive operator loses control of the saw.

In order to minimize the possibility of declutching being inhibited by reason of slowing of the inertia element of the hub, the inertia clutch assembly includes a cage, in the preferred form of a cylindrical sleeve 70, which interconnects the friction-reducing roller elements 64. As may be viewed in FIGS. 8 and 9, the sleeve cage 70 is disposed radially between the inertia element 70 and the hub 30 and includes a plurality of peripherally spaced, circular apertures 72, each of which houses one of the bearing balls 64 with minimal clearance. In this fashion, it will be assured that the balls 64 will shift substantially uniformly within the slots 60 while urging the clutching element axially. Consequently, the danger that the balls will shift non-uniformly, will be virtually eliminated.

The inertia clutch assembly also includes a restraining mechanism which functions to prevent operation of the cutter chain until the engine reaches the predetermined clutching speed. This restraining mechanism preferably includes a plurality of locking pawls or latches 74 which are received within elongated openings 76 in the periphery of the cage sleeve 70. Each pawl is provided with a curved notch 70 (FIG. 7) which overlies one end of its opening 76 to define therewith a pivotal mounting for the pawl.

The other end of each pawl is provided with a projection 80 which defines an abutment shoulder 82. Connected between the pawls 74 is a wire spring 84. The ends of the spring 86 are mounted within holes 88 in the pawls and bias the pawls radially inwardly. A cap 90 is secured to the end of the drive shaft between the hub 30 and the nut 32 so as to be axially stationary. The cap 90 contains a pair of locking grooves 92 which are operable to receive the pawls 74.

The spring 74 normally maintains the pawls in an inwardly biased posture within the grooves 92 (FIG. 2), when the engine is at rest or at idle speed. During this time, axial movement of the inertia element toward its clutching posture is prevented due to the interengagement of the pawls with the cage sleeve 74 and the cap 90.

In this fashion, the inertia element will be prevented from shifting to a clutching posture while the engine is idling. Consequently, the chain saw, while idling, is capable of withstanding significant force, including those generated by its own "kicking or "jerking" behavior, without producing sudden and dangerous activation of the cutter chain.

When the engine reaches the predetermined clutching speed, however, centrifugal force will pivot the pawls radially outwardly from the grooves 92 (FIG. 6). Axial movement of the inertia element 50 may then be initiated.

While it is within the scope of the invention to provide direct clutching engagement between the inertia element 50 and the pressure face 46, it is preferable that a compression spring be operably disposed therebetween to bias the inertia element in a direction away from the pressure plate 34. One suitable form of spring comprises a resilient disc, such as a belville washer 96, which is axially interposed between the pressure plate 34 and the inertia element 50. Axial movement of the inertia element toward the pressure plate 34 will compress the spring 96 such that rotary motion is transmitted from the inertia element to the pressure plate through the spring 96. Conversely, when the engine control mechanism is shifted from a chain-operating condition to an idling or stopping condition, axial displacement of the inertia element is immediately facilitated by the spring 96 which aids in overcoming resistance to declutching movement of the inertia element 50. This arrangement is particularly significant when rapid declutching is required.

It is apparent that the inertia clutch arrangement described this far produces an almost immediate uncoupling of the drive transmission to the pressure plate 34 when the throttle trigger 23 is released. In conjunction therewith, the inertia clutch assembly according to the present invention features a braking mechanism which frictionally arrests rotary movement of the pressure plate. This braking mechanism is best viewed in FIG. 3 and consists of a braking shoe 100 disposed adjacent the pressure plate 34.

Figure 3:
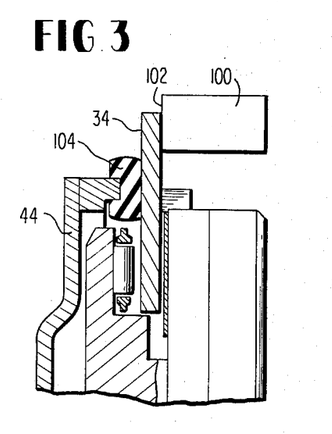
FIG. 3 is a partial longitudinal sectional view illustrating details of a brake mechanism forming part of the novel inertia clutch mechanism.
Figure 4:
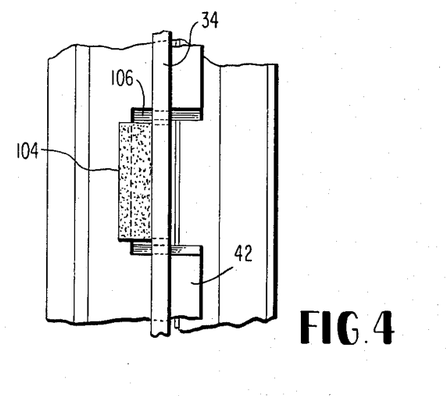
FIG. 4 is a top view of the clutch portion illustrated in FIG. 3, with a braking element omitted for clarity.

The braking shoe 100 may be of any suitable configuration, such as a series of peripherally-spaced members, or a single annular member. Any suitable attachment of the braking shoe within the housing may be provided to render the shoe in a stationary posture. The shoe is arranged to define a braking surface 102 which lies opposite the friction face of the pressure plate 34. Thus, engagement between the rotating pressure plate 34 and the braking shoe 100 will generate frictional resistance, thereby intensifying the rate of deceleration of the pressure plate.

The braking shoe is preferably in the form of a permanent magnet which attracts the pressure plate into firm interengagement, thereby minimizing slippage and increasing the braking friction thus generated. The magnetic forces may be overcome, however, during a subsequent clutching operation to separate the pressure plate from the shoe 100

Figure 5:
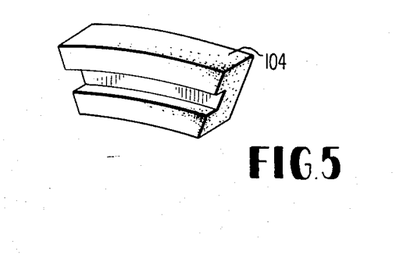
FIG. 5 is a perspective view of a spring element employed in the clutch braking mechanism.

In order to further induce frictional engagement between the pressure plate 34 and the braking shoe 100, a braking spring arrangement may be provided between the pressure plate and the coupling disc 44. Although any appropriately arranged spring mechanism may be employed, one suitable form of spring is illustrated in FIG. 3 as comprising a plurality of resilient inserts 104, depicted in perspective in FIG. 5. These inserts may be fabricated of any suitable resilient material, such as rubber for example, and are configured to fit within the recesses 106 intermediate the lugs 42.

During a clutching operation, the inserts 104 are compressed in response to axial shifting movement of the pressure plate 34 away from the braking element 102. As the pressure plate and inertia element are being declutched, however, the energy stored within the inserts 104 is applied to urge the pressure plate toward and against the magnetic braking shoe 100 (FIG. 3). Consequently, rotation of the pressure plate is quickly arrested.

It will be understood that in the event that a non-magnetic braking shoe is employed, the resilient springs 104 may be utilized as the sole means to urge the pressure plate 34 and the braking shoe 100 into friction-generating engagement.

OPERATION

Figure 2:
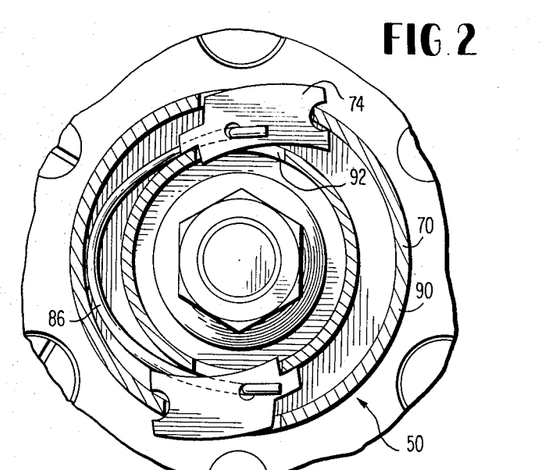
FIG. 2 is a partial cross-sectional view of the inertia clutch mechanism in a restrained condition with the engine operating below clutching speed.

A chain saw utilizing the inertia clutch assembly of the present invention is started in conventional fashion. Upon starting, the drive shaft 22 rotates the hub 30 (clockwise as viewed in FIG. 2). The slots 62 of the hub will tend to rotate relative to the balls 64 and the inertia element 50. Due to their helical configuration, the slots 62 will cam the balls 64 axially against that portion of the track 60 defined by the plate 54. In so doing, the slots would urge the inertia element 50, if unrestrained, toward the pressure plate 34. However, since the pawls 74 are lockingly seated within the locking grooves 92, such axial movement is initially restrained. Nevertheless, frictional engagement between the balls of the rotating ball assembly and the track 60 will impart rotation (clockwise) to the inertia element 50; and the hub 30, the cage 70, and the inertia element 50 will rotate (clockwise) in a declutching position (FIG. 6 illustrates this position of the inertia element, with FIG. 2 depicting the disposition of the pawls 74.)

Figure 9:
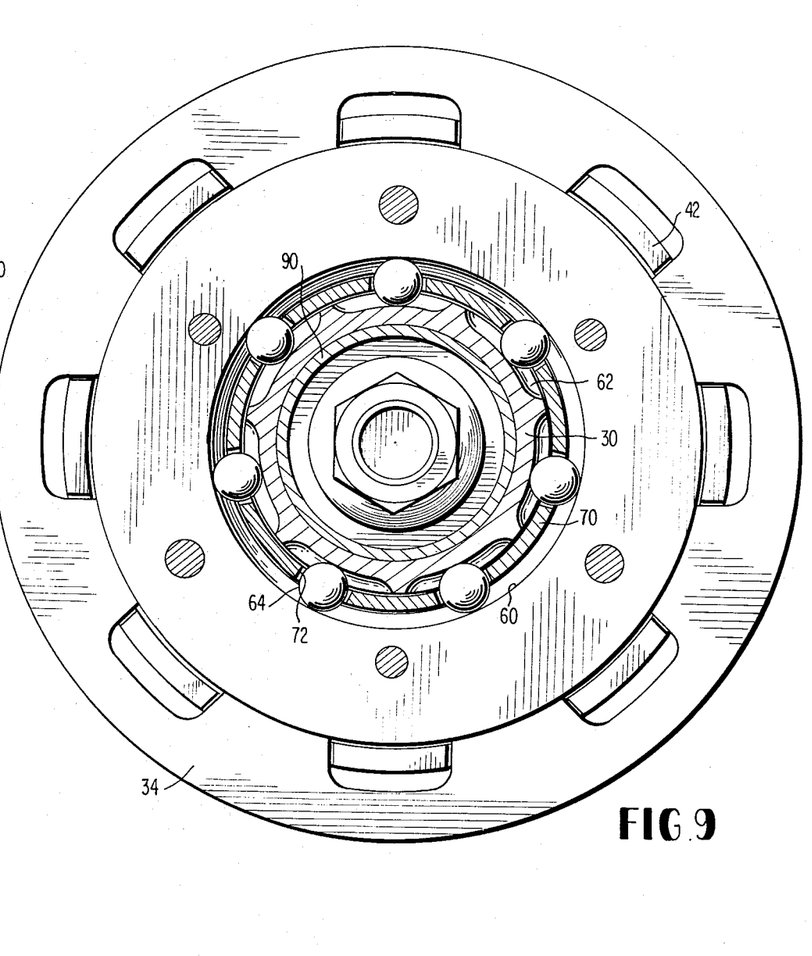
FIG. 9 is a cross-sectional view taken along the line 9—9 in FIG. 9.

When it is desired to activate the cutter chain 18, the engine throttle control switch 23 is depressed to accelerate the drive shaft 22. Acceleration of the hub 30 produces a resultant acceleration of the inertia element 50 and the cage 70. When the sped of the cage 70 reaches the predetermined clutching speed, the pawls 74 will pivot radially outwardly from the grooves 92 under the action of the centrifugal force (FIGS. 8 and 9). The balls 64, the cage 70 and the rotating inertia element 50 are then free to move axially.

Such axial movement occurs as the hub 30 continues its acceleration and overruns the inertia element 50. The slots 62 thus urge the balls, the cage, and the inertia element axially toward the pressure plate 34 until clutching engagement is effected (FIG. 8). Accordingly, rotational movement is transmitted from the row driven pressure plate 34 to the sprocket wheel 24 and the cutter chain 18.

If, during the operation of the cutter chain, the engine throttle switch 24 is released, a deceleration of the shaft 22 and the hub 30 is immediately produced. The inertia element 50 will begin to overrun the hub 30, i.e., the inertia element will rotate relative to the hub (relative clockwise rotation as viewed in FIG. 9). Frictional engagement between the inertia element and the bearing balls 64 will cause the balls to shift longitudinally within the slots. As a result, the cage and the inertia element 50 will be urged axially away from the pressure plate, i.e., toward a declutching posture, to terminate the transmission of rotary movement of the pressure plate (FIG. 6).

This axial displacement of the inertia element 50 will be aided by the spring 96 which biases the inertia element 50 to assist in overcoming frictional resistance.

During the declutching operation all of the friction-reducing balls 64 will be interconnected for uniform movement within the slots 62 by means of the cage sleeve 70. As a result, there will be little chance that the inertia element will become skewed on the hub in a manner which could retard the rate of declutching.

Significantly, the previously described declutching operation occurs almost immediately subsequent to release of the throttle switch and independently of the predetermined clutching speed. That is, declutching is effected even though the drive train may be rotating at speeds well above the predetermined clutching speed.

When the speed of the engine diminishes to a rate below clutching speed, the spring 86 biases the locking pawls 74 radially inwardly into the locking grooves 92 to secure the cage 70, and thus the inertia element, against axial displacement toward the pressure plate 34

(FIG. 2). Thus, kicking, or jerking movements of the saw operating at idle will be capable of accidentally activating the cutter chain.

As the inertia element is being displaced away from the pressure plate 34, the latter will be urged into frictional braking engagement with the braking shoe 100 by means of the resilient inserts 104 and the magnetic attraction between the pressure plate and the shoe 100 (FIG. 3). This effect a rapid deceleration and stoppage of the pressure plate, and hence, the cutting chain.

It will be apparent that in accordance with the teachings of the present invention, the location of the slots 62 and the track 60 could be reversed such that the slots are disposed in the inertia element 50 and the recesses are situated in the hub 30, without diminishing the subsequently described advantages.

It will also be apparent that although the caged ball assembly provides the transmission means for both rotating the inertia element and translating the element in the illustrated embodiment of the invention, it is envisioned that other means may be employed to carry out either or both of those functions.

SUMMARY OF MAJOR ADVANTAGES AND SCOPE OF THE INVENTION

From the foregoing, it will be appreciated that the provision of an automatically operating restraining mechanism in conjunction with an inertia clutch insures against inadvertent activation of the power train, such as might drive the cutter chain of a chain saw, prior to operation of the engine above a predetermined clutching speed.

The combination of an inertia clutch having friction reducing rollers interconnected by a cage provides smooth and rapid operation of the clutch. This is particularly useful in a power tool, such as a chain saw, where it is advantageous that the power drive to the cutter chain be declutched rapidly.

Also significant is the employment of a pressure plate for a chain saw in conjunction with a magnetic brake shoe and/or a braking spring arrangement to facilitate rapid arresting of cutting chain rotation.

The deployment of a spring between the pressure plate and the inertia element of an inertia clutch mechanism aids in overcoming frictional resistance to clutch disengagement.

Although the invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A chain saw comprising:
   a housing including manual gripping means;
   an internal combustion engine carried by said housing;
   a guide bar connected to and projecting from said housing;
   a drive wheel rotatably mounted adjacent an inner end of said guide bar;
   an endless cutter chain entrained around said bar and said drive wheel;
   a drive train for drivingly interconnecting the engine to the drive wheel to drive said cutter chain;
   said drive train including engine-driven rotary means;
   inertia clutch means operably connected to the drive train and comprising:
   inertia means drivingly coupled to said rotary means and being axially displaceable relative to said rotary means
   into a clutching posture in response to acceleration of said rotary means relative to said inertia means, and
   into a declutching posture in response to deceleration of said rotary means relative to said inertia means; and
   restraining means operably connected to said inertia means and
   being responsive to operation of said engine below a predetermined speed to restrain said inertia means from axial movement into said clutching posture, and
   being responsive to operation of said engine above the predetermined speed to permit axial movement of said inertia means into said clutching posture.

2. A chain saw in accordance with claim 1 wherein said inertia clutch means further includes pressure plate means coupled to said drive wheel; brake shoe means spaced from a clutching face of said pressure plate means during clutching of said pressure plate means; and means for urging said pressure plate means and said brake shoe means into frictional braking engagement in response to separation of said pressure plate means and said inertia means.

3. A chain saw in accordance with claim 2 wherein said pressure plate means is translatable toward and away from said brake shoe means; and said urging means comprises spring means yieldable to store energy when said pressure plate means is clutched and operable to translate said pressure plate means against said brake shoe means when said pressure plate means is declutched.

4. A chain saw in accordance with claim 3 wherein said brake shoe means comprises magnetic force generating means for magnetically attracting said pressure plate means.

5. A chain saw in accordance with claim 2 wherein said brake shoe means and said urging means comprise magnetic brake shoe means.

6. A chain saw in accordance with claim 1 wherein said restraining means comprises pawl means having spring means biasing said pawl means radially inwardly into a restraining posture; said pawl means being operable under the influence of centrifugal force to overcome said spring means and shift radially outwardly to a non-restraining posture.

7. A chain saw in accordance with claim 6 wherein said pawl means comprises a pair of pawls peripherally spaced around an axially stationary portion of said drive train; each of said pawls being operably connected at one end for radial pivotal movement relative to said inertia means toward and away from a groove carried by said axially stationary portion; said spring means comprising a wire spring extending around said portion and interconnecting said pawls.

8. A chain saw comprising:
   a housing including manual gripping means;
   an internal combustion engine carried by said housing;

a guide bar connected to and projecting from said housing;

a drive wheel rotatably mounted adjacent an inner end of said guide bar;

an endless cutter chain entrained around said guide bar and said drive wheel;

a drive train for drivingly interconnecting the engine to the drive wheel to drive said cutter chain;

said drive train including a drive shaft connected to said engine;

said drive train also including a hub mounted on said drive shaft for rotation therewith;

an inertia wheel drivingly coupled to said hub and being axially displaceable relative to said hub;

one of said inertia wheel and said hub carrying a plurality of slots arranged helically relative to said axis;

the other of said inertia wheel and said hub carrying an annular race radially spaced from said facing said slots;

a plurality of bearing balls, each ball being disposed partially in one of said slots and partially in said annular race;

said balls being arranged to shift longitudinally within said slots, in response to acceleration of said hub relative to said inertia wheel, to urge said inertia wheel in an axial clutching direction to effect a rotation-transmitting coupling between said engine and said drive wheel;

said balls being arranged to shift longitudinally within said slots, in response to deceleration of said hub relative to said inertia wheel, to urge said inertia wheel in an axial declutching direction to decouple the engine from driving relationship with said drive wheel; and a cage sleeve being radially disposed between said radially spaced annular race and slots and having circular apertures defining axially spaced surface means receiving said plurality of balls for restraining relative axial movement of said plurality of balls to effect a substantially uniform axial displacement of said inertia wheel.

9. A chain saw in accordance with claim 8 wherein said inertia clutch assembly further comprises a pressure plate drivingly coupled to said power train to drive said drive wheel in response to being driven by said inertia wheel in the clutching posture thereof; and spring means operably disposed between said pressure plate and said inertia wheel to bias said inertia wheel toward said declutching posture.

10. A chain saw in accordance with claim 9 wherein said declutching spring means comprises a resilient disc.

11. A chain saw in accordance with claim 8 wherein said inertia clutch assembly includes restraining means operably connected to said inertia wheel, said restraining means being responsive to operation of said engine below a selected speed to restrain said inertia wheel from axial movement into said clutching posture, and being responsive to operation of said engine at the selected speed to permit axial movement of said inertia wheel into said clutching posture.

12. A chain saw in accordance with claim 11 wherein said inertia clutch assembly includes pawl means pivotally mounted on said cage sleeve for radial movement toward and away from grooves carried by an axially stationary portion of said drive train; said pawl means being spring biased radially inwardly to a restraining posture and being operable to shift radially outwardly under the influence of centrifugal force to a nonrestraining posture.

13. A chain saw in accordance with claim 8 wherein said inertia clutch means further includes pressure plate means coupled to said drive wheel; brake shoe means spaced from the clutching face of said pressure plate means during clutching of said pressure plate means; and means for urging said pressure plate meana and said brake shoe means into frictional braking engagement in response to separation of said pressure plate means and said inertia wheel.

14. A chain saw in accordance with claim 13 wherein said pressure plate means is translatable toward and away from said brake shoe means; and said urging means comprises spring means yieldable to store energy when said pressure plate means is clutched and operable to translate said pressure plate means against said brake shoe means when said pressure plate means is declutched.

15. A chain saw in accordance with claim 14 wherein said brake shoe means comprises magnetic force generating means for magnetically attracting said pressure plate means.

16. A chain saw in accordance with claim 13 wherein said brake shoe means and said urging means comprise magnetic brake shoe means.

17. An inertia clutch assembly for use in a power drive system, said power drive systen including an engine, driven means, a drive train for drivingly connecting the engine to the driven means, the drive train including engine-driven rotary means, the inertia clutch assembly being operably connected to the drive train and comprising:

inertia means drivingly coupled to said rotary means and being axially displaceable relative to said rotary means into a clutching posture in response to acceleration of said rotary means relative to said inertia means, and into a declutching posture in response to deceleration of said rotary means relative to said inertia means; and restraining means operably connected to said inertia means and being responsive to operation of said engine below a predetermined speed to restrain said inertia means from axial movement into said clutching posture, and being responsive to operation of said engine above the predetermined speed to permit axial movement of said inertia means into said coupling posture.

18. A clutch assembly in accordance with claim 17 wherein said restraining means comprises pawl means having spring means biasing said pawl means radially inwardly into a restraining posture; said pawl means being operable under the influence of centrifugal force to overcome said spring means and shift radially outwardly to a nonrestraining posture.

19. A clutch assembly in accordance with claim 17 wherein said inertia clutch means further includes plate means coupled to said driven means; brake shoe means spaced from the clutching face of said pressure plate means during clutching of said pressure plate means;

and means for urging said pressure plate means and said brake shoe means into frictional braking engagement in response to separation of said pressure plate means and said inertia means.

20. A clutch assembly in accordance with claim 19 wherein said pressure plate means is translatable toward and away from said brake shoe means; and said urging means comprises spring means yieldable to store energy when said pressure plate means is clutched and operable to translate said pressure plate means against said brake shoe means when said pressure plate means is declutched.

21. A clutch assembly in accordance with claim 20 wherei said brake shoe means comproses magnetic force generating means for magnetically atrracting said pressure plate means.

22. A clutch assembly in accordance with claim 19 wherein said brake shoe means and said urging means comprise magnetic brake shoe means.

23. An inertia clutch assembly for use in a power drive system, the power drive system including an engine, driven means, a drive train for drivingly connecting the engine to the driven means, the drive train including engine-driven rotary means, the inertia clutch assembly being operably connected to the drive train and comprising:
 inertia means drivingly coupled to said rotary means and being axially displaceable relative to said rotary means;
  one of said inertia means and said rotary means carrying a plurality of slots arranged helically relative to said axis;
  the other of said inertia means and said rotary means carrying recess means radially spaced from and facing said slots;
 a plurality of friction-reducing roller means, each roller means being disposed partially in one of said slots and partially in said recess means,
  said roller means being arranged to roll longitudinally within said slots, in response to acceleration of said rotary means relative to said inertia means, to urge said inertia means in an axial clutching direction to effect a rotation-transmitting coupling between said engine and said driven means;
  said roller means being arranged to roll longitudinally within said slots, in response to deceleration of said rotary means relative to said inertia means, to urge said inertia means in axial declutching direction to decouple the engine from driving relationship with said driven means; and cage means being radially disposed between said radially spaced recess means and slots and having axially spaced surface means receiving said plurality of roller means for restraining relative axial movement of said plurality of roller means to effect a substantially uniform axial displacement of said inertia means, and
 restraining means operably connected to said inertia means and being responsive to operation of said engine above a predetermined speed to permit axial movement of said inertia means into said coupled posture.

24. A clutch assembly in accordance with claim 23 wherein said restraining means comprises pawl means having spring means biasing said pawl means radially inwardly to a restraining posture; said pawl means being operable under the influence of centrifugal force to overcome said spring means and shift radially outwardly to a non-restraining posture.

25. A clutch assembly in accordance with claim 23 wherein said inertia clutch means further includes pressure plate means coupled to said driven means; brake shoe means spaced from the clutching face of said pressure plate means during clutching of said pressure plate means; and means for urging said pressure plate means and said brake shoe means into frictional braking engagement in response to separation of said pressure plate means and said inertia means.

26. A clutch assembly in accordance with claim 25 wherein said pressure plate means is translatable toward and away from said brake shoe means; and said urging means comprises spring means yieldable to store energy when said pressure plate means is clutched and operable to translate said pressure plate means against said brake shoe means when said pressure plate means is declutched.

27. A clutch assembly in accordance with claim 26 wherein said brake shoe means comprises magnetic force generating means for magnetically attracting said pressure plate means.

28. A clutch assembly in accordance with claim 25 wherein said brake shoe means and said urging means comprise magnetic brake shoe means.

29. A clutch drive assembly comprising: rotary drive means;
 rotatable driven means;
 clutch means for selectively clutching said rotary drive means with said rotatable driven means and for selectively declutching said rotary drive means from said rotatable driven means;
 said clutch means including
  rotatable inertia means axially movable between a first declutching position and a second clutching position;
  rotation drive transmission means for transmitting rotary motion of said rotary drive means to said rotatable inertia means;
  translation drive transmission means for moving said rotatable inertia means between said clutching and declutching positions;
  releasable restraining means for selectively maintaining said rotatable inertia means in said declutching position, said restraining means including means automatically responsive to predetermined rotary speed to release said inertia means;

said translation drive transmission means, upon release of said restraining means, being operable to move said inertia means from said declutching position; and
  said translation drive transmission means being operable, in response to deceleration of said rotary drive means relative to said inertia means, to move said inertia means from said clutching position to said declutching position independently of the speed of rotation of said rotary drive means.

30. A clutch assembly in accordance with claim 29 wherein said restraining means comprises pawl means having spring means biasing said pawl means radially inwardly into a restraining posture; said pawl means being operable under the influence of centrifugal force to overcome said spring means and shift radially outwardly to a non-restraining posture.

31. A clutch assembly in accordance with claim 29 wherein said rotation drive transmission means and said translation drive transmission means comprises a plurality of friction-reducing roller means, each roller means being disposed partially in a slot formed on one of said rotary drive means and said rotatable inertia means and partially in track means formed on the other thereof;
- said roller means being arranged to shift longitudinally within said slots, in response to acceleration of said rotary drive means relative to said rotatable inertia means, to urge said rotatable inertia means in an axial clutching direction;
- said roller means being arranged to shift longitudinally within said slots, in response to deceleration of said rotary drive means relative to said rotatable inertia means, to urge said rotatable inertia means in an axial declutching direction; and
- cage means interconnecting said roller means for effecting a substantially uniform axial displacement of said rotatable inertia means.

32. A clutch assembly in accordance with claim 29 wherein said inertia clutch means further includes pressure plate means coupled to said drive wheel; brake shoe means spaced from the clutching face of said pressure plate means; and means for urging said pressure plate means and said brake shoe means into frictional braking engagement in response to separation of said pressure plate means and said inertia means.

33. A clutch assembly in accordance with claim 32 wherein said pressure plate means is translatable toward and away from said brake shoe means; and said urging means comprises spring means yieldable to store energy when said pressure plate means is clutched and operable to translate said pressure plate means against said brake shoe means when said pressure plate means is declutched.

34. A clutch assembly in accordance with claim 33 wherein said shoe means comprises magnetic force generating means for magnetically attracting said pressure plate means.

35. A clutch assembly in accordance with claim 32 wherein said brake shoe means and said urging means comprise magnetic brake shoe means.

36. A chain saw comprising:
- a housing including manual gripping means;
- an internal combustion engine carried by said housing;
- a guide bar connected to and projecting from said housing;
- a drive wheel rotatably mounted adjacent an inner end of said guide bar;
- an endless cutter chain entrained around said guide bar and said drive wheel;
- a drive train for drivingly interconnecting the engine to the drive wheel to drive said cutter chain;
- said drive train including engine-driven rotary means;
- inertia clutch means operably connected to the drive train and comprising:
  - axially movable pressure plate means;
  - inertia means drivingly coupled to said rotary means and being axially displaceable relative to said rotary means
  - into a clutching posture relative to said pressure plate means in response to acceleration of said rotary means relative to said inertia means, and
  - into a declutching posture relative to said pressure plate means in response to deceleration of said rotary means relative to said inertia means;
- a coupling member connected to said drive wheel and including a plurality of lugs located radially outwardly of said inertia means, said lugs being received in slots in said pressure plate means;
- brake shoe means spaced from the clutching face of said pressure plate means during clutching of said pressure plate means; and
- urging means including spring means disposed between said lugs for urging said pressure plate means and said brake shoe means into frictional braking engagement in response to separation of said pressure plate means and said inertia means.

37. A chain saw in accordance with claim 36 wherein said pressure plate means is translatable toward and away from said brake shoe means; said spring means being yieldable to store energy when said pressure plate means is clutched and operable to translate said pressure plate means against said brake shoe means when said pressure plate means is declutched.

38. A chain saw in accordance with claim 37 wherein said brake shoe means comprises magnetic force generating means for magnetically attracting said pressure plate means.

39. A chain saw in accordance with claim 36 wherein said brake shoe means and said urging means comprise magnetic brake shoe means.

40. A chain saw comprising:
- a housing including manual gripping means;
- an internal combustion engine carried by the housing;
- a guide bar connected to and projecting from said housing;
- a sprocket wheel rotatably mounted on said housing;
- an endless cutter chain entrained around said guide bar and said sprocket wheel;
- rotary drive means including;
  - a drive shaft connected to said engine and extending axially through said sprocket wheel;
  - a hub mounted on said drive shaft for rotation therewith;
  - said hub including a plurality of helically extending slots carried by an outer peripheral surface thereof;
- an inertia wheel journaled on said hub and including an inner peripheral surface overlying said outer peripheral surface, said inner surface including an annular race facing said slots;
- a plurality of bearing balls, each ball being partially disposed in one of said slots and partially disposed in said race;
  - each ball bearing being longitudinally shiftably mounted in its respective slot;
- a pressure plate rotatably mounted relative to said hub; means drivingly connecting said pressure plate to said sprocket wheel;
  - said inertia wheel being disposed in axially facing relationship to said pressure plate;

a resilient disc mounted on said hub and axially interposed between said pressure plate and said inertia wheel;

said bearing balls being arranged to shift longitudinally within said slots, in response to acceleration of said drive shaft relative to said inertia wheel, to urge said inertia wheel axially against said resilient disc to compress said disc into rotation-transmitting relationship with said pressure plate;

said bearing balls being arranged to shift longitudinally within said slots, in response to deceleration of said drive shaft relative to said inertia wheel, to urge said inertia wheel axially away from said disc to a declutching posture;

said resilient disc being operable to spring-bias said inertia wheel toward the declutching posture thereof;

a cylindrical cage sleeve radially interpposed between said inner and outer peripheral surface and including a plurality of circular apertures encompassing respective ones of said bearing balls for effecting a substantially uniform shifting of said balls within said slots during axial displacement of said inertia means;

a pair of diametrically opposed pawls mounted on said cage sleeve for radial pivotal movement toward a pair of grooves carried by an axially stationary portion of said rotary drive means; and a U-shaped spring wire disposed circumferentially around said drive shaft and being coupled at its ends to said pawls;

said spring wire being arranged to bias said pawls radially inwardly into said grooves to restrain said cage and said inertia wheel from axial displacement toward said pressure plate; and said spring wire being yieldable in response to rotation of said drive shaft at a selected speed to accommodate radially outward movement of said pawls from said grooves to release said cage sleeve and said inertia wheel for axial displacement toward said pressure plate.

41. A chain saw in accordance with claim 40 wherein said means drivingly connecting said pressure plate to said sprocket wheel comprises a coupling disc having peripherally spaced lugs extending parallel to the axis of said pressure plate; said pressure plate being metallic and including a plurality of slots corresponding to and matingly receiving said lugs; said pressure plate means being axially translatable relative to said coupling disc; a brake shoe comprising a permanent magnet spaced axially from the clutching face of said pressure plate during clutching of said pressure plate; and spring means disposed between said coupling disc and said pressure plate to urge said pressure plate against said brake shoe in response to declutching of said pressure plate.

* * * * *

UNITED STATES PATENT OFFICE
CERTIFICATE OF CORRECTION

Patent No. 3,857,180            Dated December 31, 1974

Inventor(s) JAMES L. DOOLEY

It is certified that error appears in the above-identified patent and that said Letters Patent are hereby corrected as shown below:

Col. 2, line 63 "clutch" should be --clutching--.
Col. 3, line 52 "numberals" should be --numerals--.
Col. 4, line 4 "corss" should be --cross--.
Col. 4, line 52 "24" should be --34--.
Col. 6, line 5 "of" should be --on--.
Col. 6, line 30 "84" should be --86--.
Col. 6, line 37 "74" should be --86--.
Col. 6, line 42 "74" should be --70--.
Col. 6, line 48 "kicking" should be enclosed in quotation marks.
Col. 8, line 20 "sped" should be --speed--.
Col. 8, lines 31-32 cancel "row driven".
Col. 9, line 2 "capable" should be --incapable--.
Col. 9, line 9 "effect" should be --effects--.
Col. 9, line 19 "the" (second occurrence) should be --that--.
Claim 1, line 9 after "said" insert --guide--.
Claim 13, line 6 "meana" should be --means--.
Claim 17, line 2 "systen" should be --system--.
Claim 21, line 2 "wherei" should be --wherein-- and "comproses" should be --comprises--.
Claim 21, line 3 "atrracting" should be --attracting--.
Claim 34, line 2 after "said" insert --brake--.
Column 17, line 19 "interpposed" should be --interposed--.
Column 17, line 20 "surface" should be --surfaces--.

Signed and sealed this 22nd day of April 1975.

(SEAL)
Attest:

RUTH C. MASON
Attesting Officer

C. MARSHALL DANN
Commissioner of Patents
and Trademarks